Figure 1:
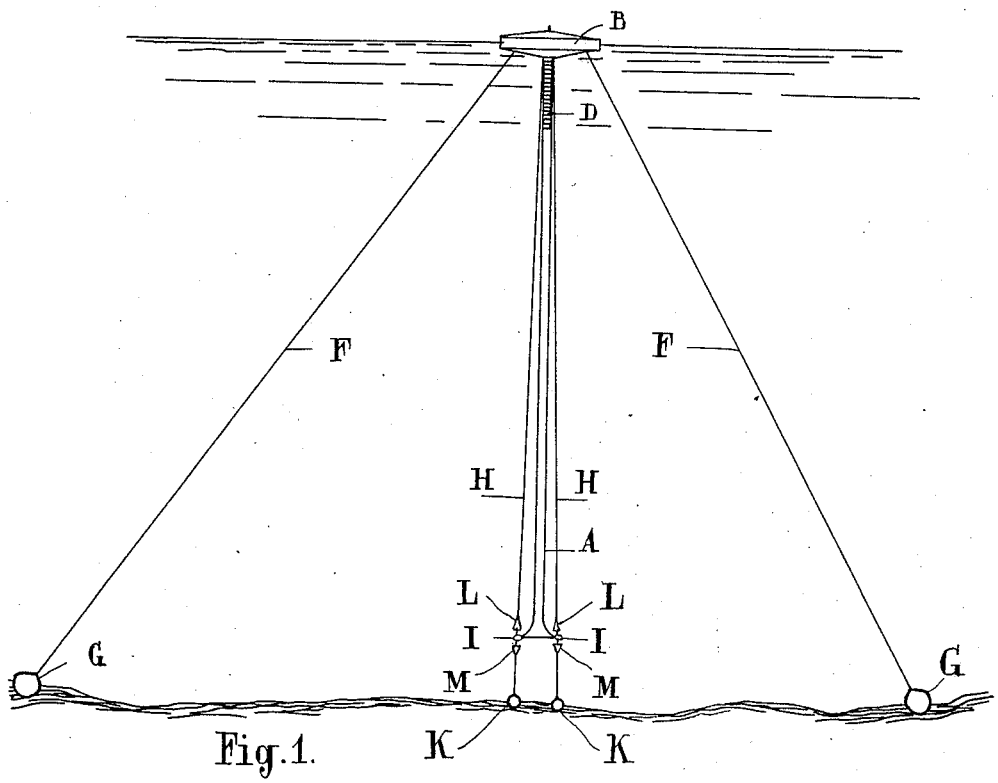

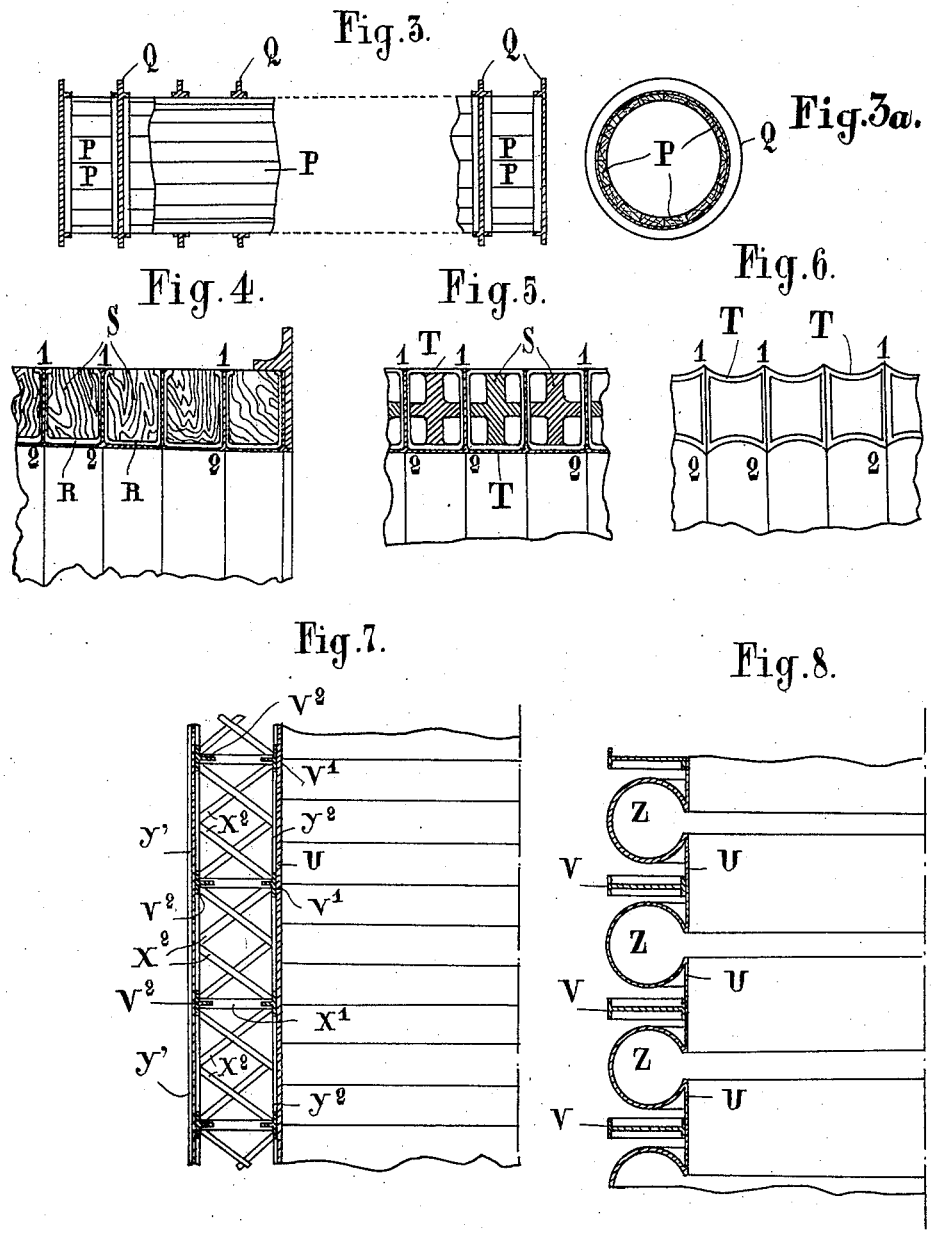

Patented Aug. 9, 1932

1,871,034

UNITED STATES PATENT OFFICE

PAUL BOUCHEROT AND GEORGES CLAUDE, OF PARIS, FRANCE

SUBMARINE WATER-DUCT

Application filed October 28, 1927, Serial No. 229,357, and in France November 18, 1926. Renewed June 17, 1932.

The invention relates to a device for obtaining large amounts of cool sea water from ocean depths, such as 1,000 or 1,200 meters, for utilization in low pressure steam turbines or for other purposes. One use of such water is set forth in full in our co-pending application filed October 28, 1927, Serial No. 229,358.

Insofar as we know, no submerged water duct or tube, having the scope and characteristics of our invention, has ever been employed. Our conduit has novel features designed to meet the unique problems encountered therein. Where, in an extensive low pressure steam unit, or other plant, large quantities of cool water are required for condensation, or other cooling purposes, a duct delivering some 200 cubic meters per second may be needed. This makes essential an inner diameter of the order of from 10 to 15 meters. The size and structure of the duct is determined by the water requirement and may vary greatly.

Although the tube at its lower end is submerged in water at a pressure of some 50 or 100 atmospheres, this force is neutralized by the inside pressure of approximately the same amount. However, the strains of starting and stopping the flow, as well as the stresses of the tube's own weight and of submarine currents, make strength imperative. This strength is limited, however, by the requirement of a reasonable lightness permitting the inspecting and repairing of the tube.

We prefer to construct the duct so that the different sections will have a specific gravity approximately adapted to balance the density of the water displaced, and we also must take into consideration the question of thermal insulation. The relative importance of these factors will vary with the diameter of the duct. Thus, if the duct is small it may be built of wood like a cask, reinforced by steel hoops proportioned to give the proper weight. In such case the wood is a good insulation. When large ducts are used it is necessary to use metal. This, of course, is a poor insulator but as the diameter increases the need for insulation is reduced as the volume increases much more rapidly than the surface; however, with metal the problem of counterbalance is more difficult but we have found that this can be met by the use of fluid tight chambers which are filled with air or other gas. We recommend a gas pressure which will approximately neutralize the water pressure in the depth at which the chamber is submerged. This means that with the exception of the times when the tube is raised, the fluid tight chambers will not be under a pressure strain.

The duct may either be substantially vertical, connected with a floating body, or it may roughly follow the line of the shore recession. In the latter case the action of the waves may be met by connecting the upper end of the duct to an underground tunnel, but in the case of vertical tubes where the power house floats upon the water above, a special feature of flexibility is imparted to the tube near the surface by a series of resilient tori, which prevent the wave motion of the float being transmitted to the tube itself. The depth to which this torus construction must extend will depend upon the exposure of the floating station and the effective depth of the waves or swells to which it may be exposed. This involves a condition of fact that may readily be ascertained in each case.

Except for the large iron device, no provision need be made to obtain longitudinal rigidity beyond the method of hooping or completely surrounding the wooden tube with sheet metal; but in the large dimensioned tubes circularly latticed girders are employed for their strengthening effect. This permits the handling of the conduit without risk in raising and lowering the same and also insures it against exceptional stresses and strains of an unforeseen nature.

Figure 2:
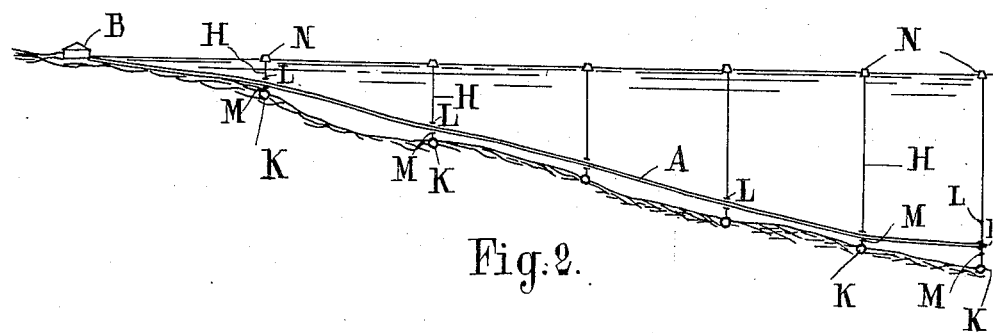

The invention can be best understood by reference to the illustrative examples shown in the accompanying drawings, in which, Fig. 1 shows a general elevation of a tube positioned vertically and feeding a power house floating on the sea surface; Fig. 2 is a similar elevation but with the tube following the recession of the shore line and connected to a power house located upon the land; Fig. 3 is a side view, and Fig. 3a is a transverse cross section of a reinforced wooden construction for a small capacity conduit; Fig. 4 illustrates in section the construction of a portion of a moderate size tube of sheet iron and wood construction; Fig. 5 shows in section a modified embodiment of sheet iron and wood construction; Fig. 6 is a view in section of a conduit of iron construction; Fig. 7 is a sectional view of an entirely metallic duct with a steel latticed reinforcement to insure rigidity, this type being for tubes of a large diameter; and Fig. 8 is a view in section of a flexible and resilient neckpiece uniting the body of the tube with the power house.

In Fig. 1, G, G represent concrete anchors connected to the power house B by lines F, F. If desired, two or more of these anchors may be used. In both Figs. 1 and 2, H, H are lines running either from floats N—N or from the power house B to rings I—I on the tubes and thereafter to anchors or concrete blocks K, K. The lines H, H are not attached directly to the rings I—I but run through these rings. However, the lines are provided with thrust blocks or stops L, L and M, M which limit the movement of the lines relative to the rings. In positioning the duct it is intended that the thrust blocks L, L will press against the rings to keep the duct under tension while a certain amount of play will be permitted at the time of raising. This, of course, will permit the anchors K, K to be broken loose from the ocean bottom before strain is exerted on the duct to raise it. As will be noted by Fig. 1, the water conduit has a flared mouth at the bottom. D in Fig. 1 represents the flexible and resilient neck construction of the tube.

In the horizontal plan view of the reinforced wood tube, as shown in Fig. 3, P, P are wooden pieces suitably impregnated under pressure and bound together like staves of a cask, by circular hoops Q, Q, Q, made of T, I or U section steel, which impart the desired cross rigidity and give the necessary weight to the structure.

In Fig. 4, there is an exemplification of the construction of a portion of a moderate size tube obtained by the joining of rings such as R, R, R, the tube being constructed merely of sheet iron and wood. Said sheet iron is first bent to a U-shape in order to impart to it the cross-section shown, after which the wings of the U are rolled so as to close the circle; the two ends brought together are welded, a ring being thereby obtained. Each ring is then joined to the preceding one by welding all around, first at 1 and then at 2. Previous to welding the periphery at 2 there is introduced into the U some type of stuffing, such as suitably impregnated wood S, S, which gives both the equilibration and heat insulation.

A modified embodiment more difficult to construct is shown in Fig. 5, wherein the wood S is completely enclosed in the sheet iron ring T which forms a tight box, the rings being welded to one another at 1 and 2.

Another modification of construction which does not employ wood is shown in Fig. 6, where each of the rings T is cambered into an arc of a circle so as not to yield to flexure. This construction is able to withstand a heavy water pressure and permits the use of the chamber for compressed air or any other compressed gas in order to obtain equilibration and heat insulation. It is best to maintain the pressure of the gas within the fluid tight chambers in such fashion as to equalize the water pressure without. In this case the construction as shown, having a concavity outwards, gives structural strength in order to withstand the pressure of the gas when the duct is raised to the surface.

Fig. 7 shows the structure used for the reinforcement of tubes of a large diameter, and in it U denotes the envelope proper made of iron plating and separating the inside water from the outside water; V', V', V' are riveted special cross section steel girders encompassing the envelope and connected with other girders V2, V2, V2 by means of hoops or channel irons and united one with the other by special cross section steel work Y', Y', Y', as well as with irons X2, X2, X2, which are in turn fixed to other longitudinal girders Y2, Y2, Y2 upon the envelope. This mounting imparts to the entire structure a sufficient cross and longitudinal rigidity without undue weight. The equilibrating cylinders, which are not shown in order to avoid complicating the figure, are secured upon the tube either with their axes set vertically or horizontally.

Equilibration could also be obtained here with wood and it is obvious that the use of the air cylinders, which have been contemplated in our application as preferable for equilibrating large tubes, can also be applied to tubes of smaller sizes either for approximate equilibration or for its complete effectuation.

In Fig. 8 a sectional view is shown of the flexible neckpiece connecting the neckpiece of the tube. This portion is constituted of rings in the form of hollow tori or circular tubes Z, Z, Z, split along their minimum diameter and connected to one another by cylindrical parts U, U, U, the whole made of riveted steel plates and suitably consolidated, if necessary, by circular latticed girders V', V', V', as described above in connection with Fig. 7, but connected together longitudinally. Equilibrating in the water may be obtained either by means of cylinders added to the system or by replacing at convenient points one of the resilient tori with a torus which is fluid tight and filled with air.

From the foregoing description it will be seen that by the constructions herein described we are able to obtain cool sea water from great ocean depths in commercial quantities by means of a submarine water duct which is equilibrated in weight with the water it displaces, which has a flexible and resilient neckpiece, and in the case of the small or moderate size conduit, has provision for thermal insulation.

It is to be understood that the examples given are intended only to be illustrative of our invention as the same is capable of development and modification in a variety of forms.

Having now particularly ascertained and described the nature of our said invention as well as the manner in which the same is to be performed, we declare that what we claim is:

1. A submarine water duct adapted to bring up water from sea depths, including means whereby the weight of the displaced water volume will be substantially equal to the weight of the duct, a ring provided upon the lower portion of said duct, a cable provided with an anchor movably attached to the lower portion of said duct by passing said cable through said ring, stops positioned above and below said ring upon said cable so that normally there is a tension by the anchor upon the stop above but so that when the cable is raised, the stop below will bear upon the ring only after the anchor is dislodged.

2. A submarine duct adapted to deliver large quantities of cool sea water from great depths, having a relatively rigid body portion and a resilient neckpiece adapted to prevent the transmission of the motion at the sea surface to the body of the duct.

3. A submarine duct designed to deliver large quantities of cool sea water from great depths comprising an extended tube open at the lower end, means for anchoring such lower end, means for raising such lower end at will, and means provided in the wall of such tube substantially to reduce the flow of heat from outside water to water contained in the tube.

4. In a duct adapted to bring up water from great depths, cables provided with anchors to moor said duct in position, means provided upon the lower portion of said duct adapted to hold said cables from lateral movement, but allowing vertical sliding movement relative to said duct and a stop provided upon said cables both above and below said means, the stop above so positioned that it is adapted to normally maintain a downward tension upon said duct, and the stop below adapted to strike said means so that an upward pull will be exerted on said duct only after the anchors are dislodged.

In testimony whereof we affix our signatures.

PAUL BOUCHEROT.
GEORGES CLAUDE.